(12) United States Patent
Scharf

(10) Patent No.: US 8,197,573 B2
(45) Date of Patent: Jun. 12, 2012

(54) METHOD AND APPARATUS FOR DEPOSITING AGENTS UPON AND WITHIN BIO-CHAR

(75) Inventor: Gerald C. Scharf, Palo Alto, CA (US)

(73) Assignee: Greenpyro, Inc., Palo Alto, CA (US)

( * ) Notice: Subject to any disclaimer, the term of this patent is extended or adjusted under 35 U.S.C. 154(b) by 711 days.

(21) Appl. No.: 12/347,845

(22) Filed: Dec. 31, 2008

(65) Prior Publication Data

US 2010/0162780 A1 Jul. 1, 2010

(51) Int. Cl.
*B05D 1/18* (2006.01)
*B32B 5/14* (2006.01)
*C05B 7/00* (2006.01)
*C05D 9/02* (2006.01)
*C05D 9/00* (2006.01)
*C05D 1/00* (2006.01)

(52) U.S. Cl. ......... 71/31; 71/34; 71/48; 71/61; 210/679; 210/911; 427/243; 428/307.3; 428/307.7

(58) Field of Classification Search ................. 71/11–30, 71/34, 31, 48, 61; 427/243; 428/307.3, 307.7; 210/679, 911
See application file for complete search history.

(56) References Cited

U.S. PATENT DOCUMENTS

| | | | | |
|---|---|---|---|---|
| 2,043,009 A | * | 6/1936 | Reich | 252/1 |
| 2,209,613 A | * | 7/1940 | Roeder | 71/12 |
| 3,172,752 A | * | 3/1965 | Pierce | 71/62 |
| 4,064,018 A | * | 12/1977 | Choi | 201/12 |
| 4,084,938 A | * | 4/1978 | Willard, Sr. | 424/125 |
| 4,300,915 A | * | 11/1981 | Schmidt et al. | 48/197 R |
| 2002/0035307 A1 | | 3/2002 | Vinegar et al. | |
| 2004/0192980 A1 | | 9/2004 | Appel et al. | |
| 2006/0096167 A1 | | 5/2006 | Dunlop | |
| 2009/0031616 A1 | * | 2/2009 | Agblevor | 44/307 |

OTHER PUBLICATIONS

PCT International Search Report for International Application No. PCT/US2009/068285 dated Aug. 2, 2010, 4 pages.
PCT Written Opinion of the International Application No. PCT/US2009/068285 dated Aug. 2, 2010, 3 pages.

* cited by examiner

*Primary Examiner* — Wayne Langel
(74) *Attorney, Agent, or Firm* — Gard & Kaslow LLP

(57) ABSTRACT

Methods and apparatuses for depositing agents relatively deep within pores of bio-char. Bio-char is first produced in an airtight oven by heating biomass feedstock. The bio-char is then cooled and steam is diffused into the pores of the bio-char. The steam-laden bio-char is immersed in a liquid bath containing soluble agents that are to be deposited in the pores of the bio-char. The liquid bath cools the char to below the condensation temperature of the steam, whereupon the condensing steam generates a partial vacuum within the pores, drawing the liquid into the pores. The bio-char is then removed from the liquid bath and dried so that the liquid within the pores evaporates, leaving behind the soluble agent. Accordingly, the invention yields bio-char that has soluble agent embedded relatively deep within its pores.

19 Claims, 2 Drawing Sheets

METHOD AND APPARATUS FOR DEPOSITING AGENTS UPON AND WITHIN BIO-CHAR

BRIEF DESCRIPTION OF THE INVENTION

This invention relates generally to agriculture. More specifically, this invention relates to the depositing of agents upon and within bio-char.

BACKGROUND OF THE INVENTION

Bio-char is the dry component that results when biomass is heated to high temperatures in the substantial absence of oxygen. Bio-char is typically produced as chunk-like, irregularly shaped particles that resemble pieces of lump charcoal. These pieces have high porosity, with multitudes of pores extending into the char from its surface.

There are a number of techniques for producing bio-char, one common one being pyrolysis, in which biomass is heated in the substantial absence of oxygen until polymers of the biomass fall apart. A common approach involves lighting biomass feedstock on fire, then at some point closing the fire off from air. The fire consumes the remainder of the oxygen, and the residual heat converts the biomass to bio-char. For typical polymers such as cellulose, this begins to happen at a temperature of approximately 330° C. In addition to carbonizing the biomass, these high temperatures generate gases within the biomass. The rapid expansion of these gases forms pores within the bio-char. For example, at moderate heating rates and temperatures of approximately 400-500° C., bio-char is produced with a significant number of pores that are typically long but narrow, e.g., about 0.7-3.0 microns in diameter. This high porosity creates high particle surface area (i.e., the total surface area including that of the pores, by weight of the bio-char). For instance, bio-char can commonly have particle surface areas in the range of 50-300 $m^2/g$. However, even with this high porosity, the small pore width allows for low water penetration into the bio-char.

Bio-char can be produced in both batch process systems and continuous process systems. Batch process systems are well known and involve processing batches of biomass in an airtight oven. Continuous process systems make/output biomass on a continuous basis, rather than in batches, and various configurations of such systems can be employed. One common system involves a fluidized bed reactor, such as that described in U.S. Pat. No. 4,064,018, which is hereby incorporated by reference. Another system employs an externally-fired rotary kiln, and is described in U.S. Pat. No. 4,300,915, which is also hereby incorporated by reference.

Many recent efforts have focused on utilizing the above-described porosity, as well as other characteristics of bio-char, in agricultural applications. In particular, there are two distinguishing factors that make bio-char valuable as a soil conditioner. First, bio-char is long-lasting, with some estimating that upwards of 80% of bio-char applied to soil will remain 100 years after application, depending on factors such as the feedstock used to produce the bio-char. Second, as above, the char is very porous, with many narrow pores that allow the char to retain beneficial compounds while resisting water leaching. That is, the farther within the pores a compound can be deposited, the longer it will take to be transported out into soil. It is therefore desirable to embed compounds or agents relatively deep within the pores of bio-char, where low water penetration allows for long, slow release of the compounds. However, the small pore size makes such deep embedding of agents challenging.

SUMMARY OF THE INVENTION

The invention can be implemented in a number of ways, including as a method and as an apparatus.

In one embodiment, a method of incorporating an agent into bio-char comprises receiving bio-char, and supplying steam to the bio-char to introduce the steam into pores within the bio-char. The bio-char is then immersed in a liquid medium carrying at least one agent for deposition. The bio-char is cooled to below a condensation temperature of the steam, to draw at least a portion of the liquid medium into the pores of the bio-char.

In another embodiment, a method of depositing an agent on bio-char comprises receiving bio-char having pores, and drawing a liquid medium into the pores, the liquid medium containing at least one agent for deposition upon the bio-char. The liquid medium in the pores is then evaporated, so as to deposit the agent within the pores of the bio-char.

In a further embodiment, an apparatus comprises bio-char having outer surfaces and pores extending into the bio-char from the outer surfaces, the pores collectively having a total surface area, and an agent deposited within the pores to a depth of at least approximately 20 microns.

In a further embodiment, an apparatus comprises bio-char having outer surfaces and pores extending into the bio-char from the outer surfaces, the pores having a gaseous mixture within, the gaseous mixture having a pressure of approximately 0.25 atmospheres or less.

Other aspects and advantages of the invention will become apparent from the following detailed description taken in conjunction with the accompanying drawings which illustrate, by way of example, the principles of the invention.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF EMBODIMENTS OF THE INVENTION

In one embodiment, the invention relates to methods and apparatuses for depositing agents relatively deep within pores of bio-char. Most current methods are only capable of depositing agents on the outer surface of bio-char or, at most, only slightly within its pores. In contrast, embodiments of the invention can deposit agents approximately 20-25 microns, or more, into bio-char pores. Bio-char is first produced in an airtight oven by heating biomass feedstock, commonly to about 400° C. or more. The bio-char is then cooled and steam is diffused into the pores of the bio-char. The steam-laden bio-char is immersed in a liquid bath carrying soluble agents that are to be deposited in the pores of the bio-char. The liquid bath cools the char to below the condensation temperature of the steam, whereupon the condensing steam generates a partial vacuum within the pores, drawing the liquid into the pores. The bio-char is then removed from the liquid bath and dried so that the liquid within the pores evaporates, leaving behind the soluble agent. Accordingly, the invention yields bio-char that has soluble agent embedded deep within its pores. If the agent is a soil nutrient, such methods allow for bio-char that produces long, slow release of nutrients into soil, which is beneficial for plant growth.

Figure 1:
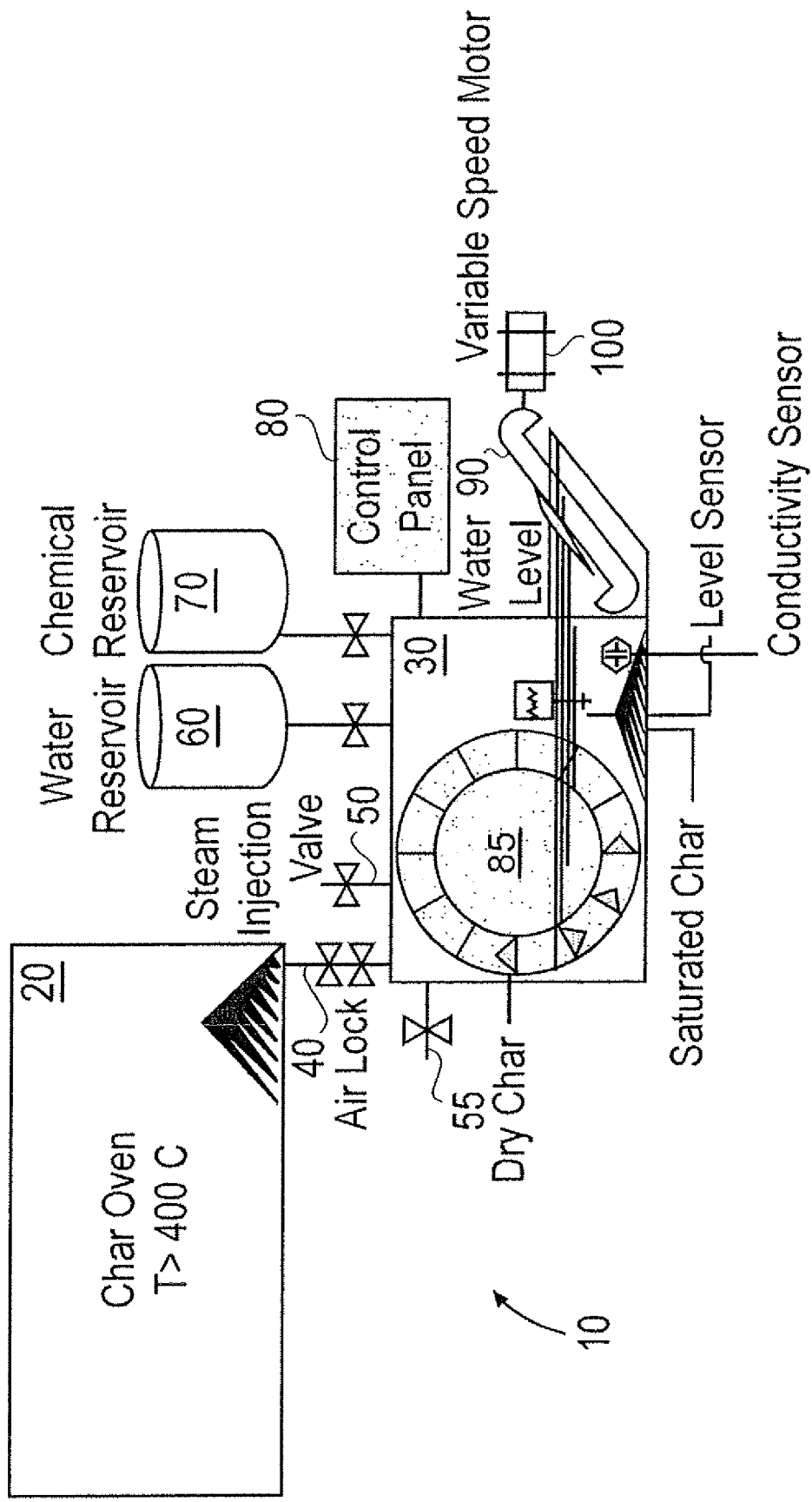
FIG. 1 illustrates a system for making bio-char in accordance with embodiments of the present invention.

FIG. 1 illustrates a system for making bio-char in accordance with embodiments of the present invention. The system 10 has an oven 20 that is airtight and equipped with a vacuum pump (not shown) for removing oxygen from the oven 20 prior to baking of the bio-char. The system 10 also has an enclosure 30 with a pipe 40 connecting the oven 20. The enclosure 30 is also connected to a steam valve 50, pressure relief valve 55, water reservoir 60, and chemical reservoir 70. The enclosure 30 is monitored and controlled by control panel 80. Water from the water reservoir 60 is pumped into the enclosure 30 along with a desired amount of water-soluble agents from chemical reservoir 70, so as to produce a water bath within the enclosure 30, as shown. The water bath is thus a liquid mixture of water and whatever agent(s) are to be deposited on/in the bio-char, e.g., chemical fertilizers or the like. The enclosure thus contains both a water bath and a steam-laden atmosphere. A first conveyor 85 is operated within the enclosure 30 so as to immerse the char in the liquid bath. A second conveyor 90 transports char from the enclosure 30 out of the water bath, for drying. The conveyor 90 can be an automatic conveyor that is powered by a motor 100.

Figure 2:
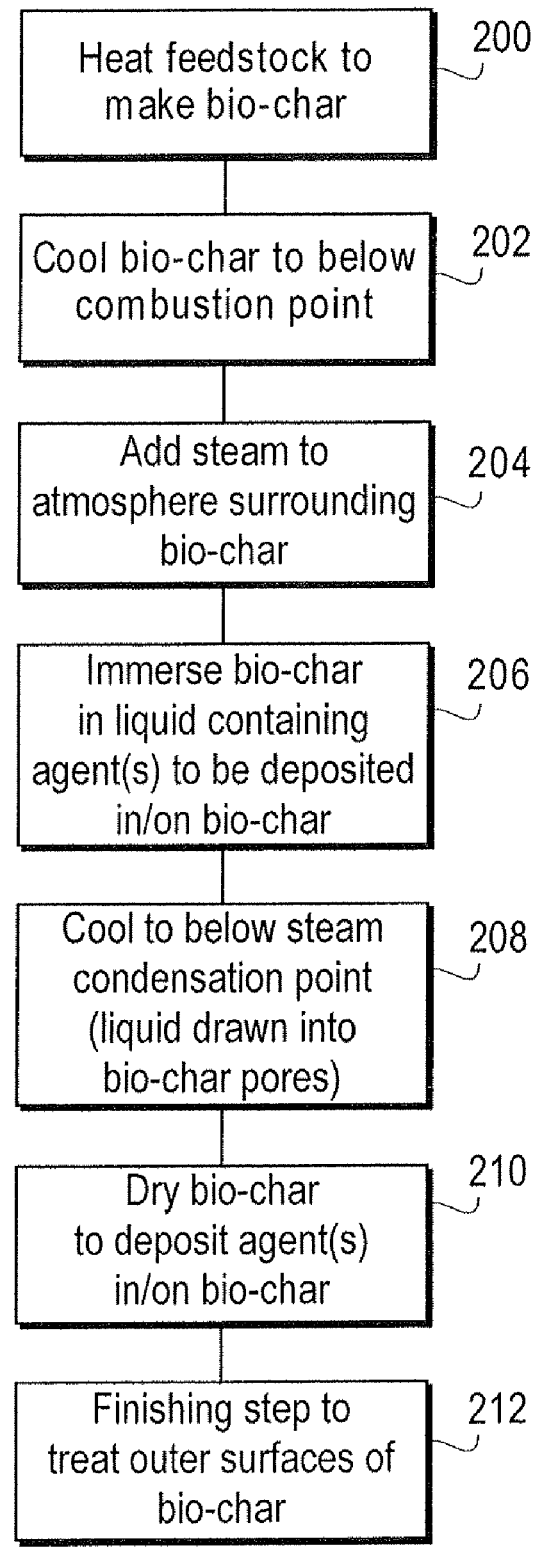
FIG. 2 illustrates process steps taken in making bio-char in accordance with embodiments of the present invention.

FIG. 2 summarizes steps that can be taken in making the bio-char of the invention. These steps can be executed by the system 10 of FIG. 1. First, feedstock biomass is placed in the oven 20, air is pumped out of the oven 20, and the oven 20 heats the feedstock to make bio-char (step 202). As above, the feedstock is typically heated to a temperature of approximately 400-500° C., for a sufficient length of time to carbonize and/or break the polymers of the biomass. This step is known. Once the feedstock has been converted to bio-char, the char is cooled to below its auto-ignition temperature (step 202), so that it does not spontaneously combust if exposed to air. This step can be carried out in the oven 20, or pipe 40. The auto-ignition temperature of bio-char varies somewhat based on factors such as the exact type of feedstock used, but is typically in the range of 160-200° C.

Next, bio-char enters the atmosphere containing steam (step 204). A number of approaches can be taken to accomplish this step. As one example, after the char is cooled to a temperature below its auto-ignition temperature but still above the boiling point of the liquid bath, it can simply be dropped through the pipe 40 into the bath. Upon contact with the bath, the hot char generates steam that infiltrates into the char's pores and also fills the enclosure 30 and pipe 40. Generated steam can also be pumped into (or otherwise allowed to enter) the oven 20, allowing the steam additional opportunity to diffuse into the bio-char pores. As another example, the steam injection valve 50 can be opened to pump steam into the enclosure 30, so that the enclosure 30 supports both a water bath below and a steam-laden atmosphere above. The bio-char drops out of the oven 20 through pipe 40, onto the first conveyor 85 within the enclosure 30. The first conveyor 85 suspends the char in the steam-laden atmosphere of the enclosure 30 for a time, allowing the char to cool further and allowing steam to enter the small pores of the char. The pressure relief valve 55 can be used to help equalize pressure between the enclosure 30 and oven 20 if desired. In either example, one of ordinary skill in the art will observe that the invention encompasses operation of the oven 20 and conveyor 85 as either a batch or a continuous system. Batch systems would operate as above, with char dropped from the oven 20 into the bath or onto the conveyor 85 at appropriate times. Continuous systems would employ an airlock at the intake of oven 20 and in pipe 40, so that feedstock can be continuously fed in, and char continuously dropped into the enclosure 30.

Prior to immersion in the steam-laden atmosphere, much of the gases within the pores results from the char manufacturing process. For example, a common makeup of the pore gases is approximately 50% hydrocarbons, 25% water, and 25% non-condensible gases. It has been determined that, done properly, much of these gases can be replaced by steam. For instance, if the char is cooled from about 500° C. to about 100° C. in a steam-laden atmosphere, about three fourths of the pore gases by volume can be replaced by steam.

As above, in one approach, hot char is simply dropped into the water bath. In another approach, once a sufficient amount of steam has been introduced into the pores of the bio-char, the first conveyor 85 moves the char into the water bath (step 206). As above, this water bath contains both water from reservoir 60 and agents from chemical tank 70. The "water" can be any liquid medium (although substances that are liquid at room temperatures and pressures, and that boil well below the combustion temperature of char, are preferred) such as a water-based compound or an alcohol, and the agents can be any compound or material soluble in this liquid and capable of deposition within the pores of the bio-char. However, commonly the liquid is water, and the chemical agents are water-soluble chemical fertilizers or other soil nutrients. Examples can include potassium salts, diammonium phosphate, or the like.

When the first conveyor 85 immerses the char in the water bath (or the char is simply dropped into the bath), the temperature of the char falls below the condensation point of the steam in the pores (i.e., below approximately 100° C.). The condensing steam generates a partial vacuum within the pores, drawing the water bath and its dissolved agents into the pores (step 208). It has been determined that, for an atmosphere of approximately three fourths steam within the bio-char pores, quenching the char in this manner will result in a vacuum pressure of about 0.25 atmospheres generated within the pores. This in turn equates to drawing the water bath at least approximately 20-25 microns deep within the pores, depending on factors such as char dimensions, bath pressure, residence time of char in the bath, etc. Residence time is one factor determining the extent to which surface tension effects assist liquid propagation into the pores, with 30-60 seconds being a preferred residence time for some embodiments.

The second conveyor 90 then removes the bio-char from the water bath, so that the char can be dried (step 210). As the char dries, the liquid within the pores evaporates, leaving the soluble chemical agents behind. In this manner, desired agents are deposited deep within the pores of bio-char (i.e., to a depth of at least 20-25 microns into the pores). Bio-char with agents deposited deep within has numerous beneficial uses. For example, such char can be applied to soil, where its small pore sizes will keep too much water from entering the pores too quickly, allowing for relatively slow release of the agent into the soil. In this manner, small amounts of nutrients can enrich soil for relatively long periods of time, as opposed to conventional fertilizers which quickly wash away, providing nutrients for only a short time before requiring reapplication.

The deposition of agents within the char can also be used for applications unrelated to soil improvement. For example, the methods of the invention can be employed in toxin remediation. In cases such as surface water contaminated with selenium salt, the toxin (selenium) is harmful in high levels but beneficial (e.g., a micronutrient) in low levels. Accordingly, selenium-contaminated surface water can be drawn into the enclosure 30 and used as the water bath. The methods of the invention can then be carried out as above, so that the selenium is drawn into the pores of the char, where it can be used to slowly release low levels of selenium into soil as a micronutrient. In this manner, methods of the invention can act to both process contaminated water and actually convert the contaminant into a micronutrient via bio-char that is deposited into soil.

In some applications, step 210 can be omitted, and the wet char placed directly into soil (or used for some other purpose) without drying. The narrow pores of the char will act to prevent rapid discharge of the liquid within, and thus the agent, even though the char is not dried.

One of ordinary skill in the art will observe that the product of the above-described process is bio-char with chemical agent deposited both on the outer surfaces of the char, and deep within its pores. This bio-char produces a combination of fast-acting and slow-acting agent release. More specifically, the agent on the outer surfaces of the char will wash off and diffuse into the soil quickly, while the agent embedded within the char's pores will diffuse more slowly. Accordingly, a finishing step can then be applied to treat these outer surfaces (step 212).

This step 212 can be carried out in different ways, depending on the desired application for the char. If only slow-acting release of the agent is desired, step 212 can be simply a washing of the char to remove the agent from the char's outer surfaces. Alternatively, fast-acting release of a different agent may be desired, in which case steps 200-210 can be applied to deposit a first agent within the char's pores, while step 212 can include washing the first agent off the outer surfaces of the char and applying a second agent instead. This allows for quick, initial release of the second, surface-bound agent (perhaps a fertilizer designed for rapid early plant growth), followed by slow, sustained release of the first, pore-bound agent (perhaps a different fertilizer designed for maintaining more mature plants). It should be noted that this second or surface-bound agent need not be applied in the same manner as the first agent, and thus can be any agent, including any non-water soluble agent. Finally, step 212 can simply be skipped, leaving the first agent on the outer surfaces and providing char that releases the same agent in both a quick initial burst, and a slower, more sustained release.

One of ordinary skill in the art will realize that the above explanations have described only a single embodiment, and that the invention encompasses other embodiments and alternatives as well. For instance, the steam-laden atmosphere can be a superheated steam atmosphere maintained at any appropriate temperature. Similarly, the steam-laden atmosphere can extend into the pipe 50, which can be sufficiently elongated as to cool the char to below its auto-ignition temperature while simultaneously allowing for incorporation of steam into the char's pores. Alternatively, the char can be cooled in the oven 20 and dropped straight into the water bath, with steam incorporated into the char's pores during the drop, or in the oven 20 prior to dropping. Additionally, the above-described processes can be used in connection with both batch process and continuous process pyrolysis systems. In particular, it can be seen that bio-char can be produced in any manner (whether by batch or continuous process) for release into enclosure 30, whereupon the above-described methods can be utilized to incorporate agents into char pores.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, any agent can be deposited on/in the char, including a different agent or agents deposited in the pores of the char, and on the outer surfaces of the char pieces. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of incorporating an agent into bio-char, comprising:
   receiving bio-char;
   supplying steam to the bio-char to introduce the steam into pores within the bio-char;
   immersing the bio-char in a liquid medium carrying at least one agent for deposition; and
   cooling the bio-char to below a condensation temperature of the steam, to draw at least a portion of the liquid medium into the pores of the bio-char.

2. The method of claim 1, wherein the agent includes diammonium phosphate.

3. The method of claim 1, further comprising removing at least a portion of the agent from outer surfaces of the bio-char.

4. The method of claim 3, further comprising applying an additional agent to the outer surfaces of the bio-char, wherein the additional agent includes a potassium salt.

5. The method of claim 1, further comprising, prior to the supplying, cooling the bio-char to a temperature below a combustion temperature of the bio-char.

6. The method of claim 3, wherein the drying further comprises drying the bio-char so as to deposit the agent within the pores to a depth of at least approximately 20 microns.

7. The method of claim 1, wherein the vacuum is a pressure of approximately 0.25 atmospheres or less.

8. The method of claim 1, wherein the liquid medium is a contaminated surface water, and the agent is a surface water contaminant.

9. A method of depositing an agent on bio-char, comprising:
   receiving bio-char having pores;
   drawing a liquid medium into the pores, the liquid medium containing at least one agent for deposition upon the bio-char, by supplying steam to the bio-char to introduce the steam into the pores of the bio-char and immersing the bio-char in a liquid medium, the liquid medium comprising the at least one agent; and
   cooling the bio-char to below a condensation temperature of the steam, and evaporating the liquid medium in the pores, so as to deposit the agent within the pores of the bio-char.

10. The method of claim 9, further comprising evaporating the liquid medium from outer surfaces of the bio-char and removing at least a portion of the agent from the outer surfaces of the bio-char.

11. The method of claim 9, further comprising applying an additional agent to the outer surfaces of the bio-char, wherein the additional agent includes a potassium salt.

12. The method of claim 9, wherein the agent includes a potassium salt.

13. A method of depositing an agent on bio-char, comprising:

receiving bio-char having pores;

drawing a liquid medium into the pores, the liquid medium containing at least one agent for deposition upon the bio-char;

evaporating the liquid medium in the pores, so as to deposit the agent within the pores of the bio-char, wherein the evaporating further comprises depositing the agent within the pores to a depth of at least approximately 20 microns.

14. The method of claim 13, wherein the drawing further comprises generating a pressure within the pores, the pressure having a magnitude of approximately 0.25 atmospheres or less.

15. The method of claim 13, wherein the liquid medium is a contaminated surface water, and the agent is a surface water contaminant.

16. A composition of matter, comprising:

bio-char having outer surfaces and pores extending into the bio-char from the outer surfaces, the pores collectively having a total surface area; and an agent deposited within the pores to a depth of at least approximately 20 microns.

17. The apparatus composition of matter of claim 16, wherein the agent includes diammonium phosphate.

18. The composition of matter of claim 16, further comprising an additional agent that includes a potassium salt.

19. The composition of matter of claim 16, wherein the agent includes a surface water contaminant.

* * * * *